(12) United States Patent
Sakata (10) Patent No.: US 8,773,703 B2
(45) Date of Patent: Jul. 8, 2014

(54) IMAGE FORMING APPARATUS TO WHICH PORTABLE STORAGE MEDIUM CAN BE CONNECTED

(71) Applicant: Kyocera Document Solutions Inc., Osaka (JP)

(72) Inventor: Hiromi Sakata, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/686,458

(22) Filed: Nov. 27, 2012

(65) Prior Publication Data

US 2013/0135676 A1    May 30, 2013

(30) Foreign Application Priority Data

Nov. 29, 2011  (JP) .................................. 2011-260533

(51) Int. Cl.
   *G06F 3/12*    (2006.01)
(52) U.S. Cl.
   USPC ......................... 358/1.15; 358/1.13; 358/1.16
(58) Field of Classification Search
   USPC ....................................................... 358/1.15
   See application file for complete search history.

(56) References Cited

U.S. PATENT DOCUMENTS

| | | | | |
|---|---|---|---|---|
| 2003/0231343 A1* | 12/2003 | Kobayashi et al. | ........... | 358/1.16 |
| 2004/0257605 A1* | 12/2004 | Hayashi | ....................... | 358/1.14 |
| 2008/0239364 A1* | 10/2008 | Nelson et al. | ................ | 358/1.15 |
| 2009/0051956 A1* | 2/2009 | Kondo | .......................... | 358/1.13 |
| 2010/0110494 A1* | 5/2010 | Park et al. | .................... | 358/1.16 |
| 2010/0188713 A1* | 7/2010 | Ogura et al. | .................. | 358/474 |

FOREIGN PATENT DOCUMENTS

| | | |
|---|---|---|
| JP | 2006-119176 | 5/2006 |
| JP | 2007-226625 | 9/2007 |

OTHER PUBLICATIONS

Japanese Office Action 2011-260533 dated Sep. 10, 2013, 3 pages.

* cited by examiner

*Primary Examiner* — Marivelisse Santiago Cordero
*Assistant Examiner* — Daryl Jackson
(74) *Attorney, Agent, or Firm* — K&L Gates LLP (57) ABSTRACT

An image forming apparatus to which a portable storage medium can be connected includes a storage unit, a connecting unit, and a control unit. The storage unit stores default setting information. A portable storage medium that can store user-specific setting information customized to the individual users is connected to the connecting unit. When the portable storage medium in which the user-specific setting information is stored is connected to the connecting unit, the control unit performs a process based on the user-specific setting information stored in the portable storage medium without changing the default setting information stored in the storage unit.

6 Claims, 8 Drawing Sheets

IMAGE FORMING APPARATUS TO WHICH PORTABLE STORAGE MEDIUM CAN BE CONNECTED

INCORPORATION BY REFERENCE

This application is based upon and claims the benefit of priority from the corresponding Japanese Patent Application No. 2011-260533, filed in the Japan Patent Office on Nov. 29, 2011, the entire contents of which are incorporated herein by reference.

FIELD

The present disclosure relates to an image forming apparatus to which a portable storage medium can be connected.

BACKGROUND

An image forming apparatus having an operation panel on which various pieces of information are displayed is known. The operation panel of the image forming apparatus is configured to display setting items that can be set when copying and to receive a setting instruction from a user.

There are many setting items that can be set when executing copying, such as reduction/enlarge, density, two-sided/division, and page aggregation. The numerous settings allow various kinds of copying. On the other hand, this has lead to inconveniences in that it is necessary to check the details of the many setting items and to change them as needed.

A conceivable method for eliminating the inconveniences is providing the image forming apparatus with a user authentication function and storing user-specific setting information customized to the individual users in an internal storage unit of the image forming apparatus. With this method, when an authenticated user logs in, the user-specific setting information about the login user may be read from the internal storage unit, and the details of the large number of setting items may be changed based on the setting information specific to the login user. Thus, settings are automatically set to desired settings only by logging in, there is no need for the user to check or change settings.

Generally, the user performs a user authentication operation when logging in. For example, a system menu key is provided on the operation panel. When a user presses the system menu key, a list of items including user authentication is displayed. When the user subsequently selects user authentication from the plurality of items, a user authentication screen is displayed. Thereafter, the user logs in by inputting a user name and password on the user authentication screen.

Accordingly, the foregoing method requires that the user perform many operations (obtaining user authentication and logging in) to automatically switch settings to desired settings. This is inconvenient for the user.

Furthermore, the foregoing method requires that a plurality of items of specific setting information corresponding to the individual users be stored in the storage unit in the image forming apparatus. This results in an enormous amount of stored information, thus requiring an increase in the capacity of the internal storage unit (resulting in an increase in cost).

SUMMARY

An image forming apparatus of the present disclosure includes a storage unit, a connecting unit, and a control unit. The storage unit stores default setting information. A portable storage medium that can store user-specific setting information customized to the individual users is connected to the connecting unit. When the portable storage medium, in which the user-specific setting information is stored, is connected to the connecting unit, the control unit performs a process based on the user-specific setting information stored in the portable storage medium without changing the default setting information stored in the storage unit.

Additional features and advantages are described herein, and will be apparent from the following Detailed Description and the figures.

DETAILED DESCRIPTION

Figure 1:
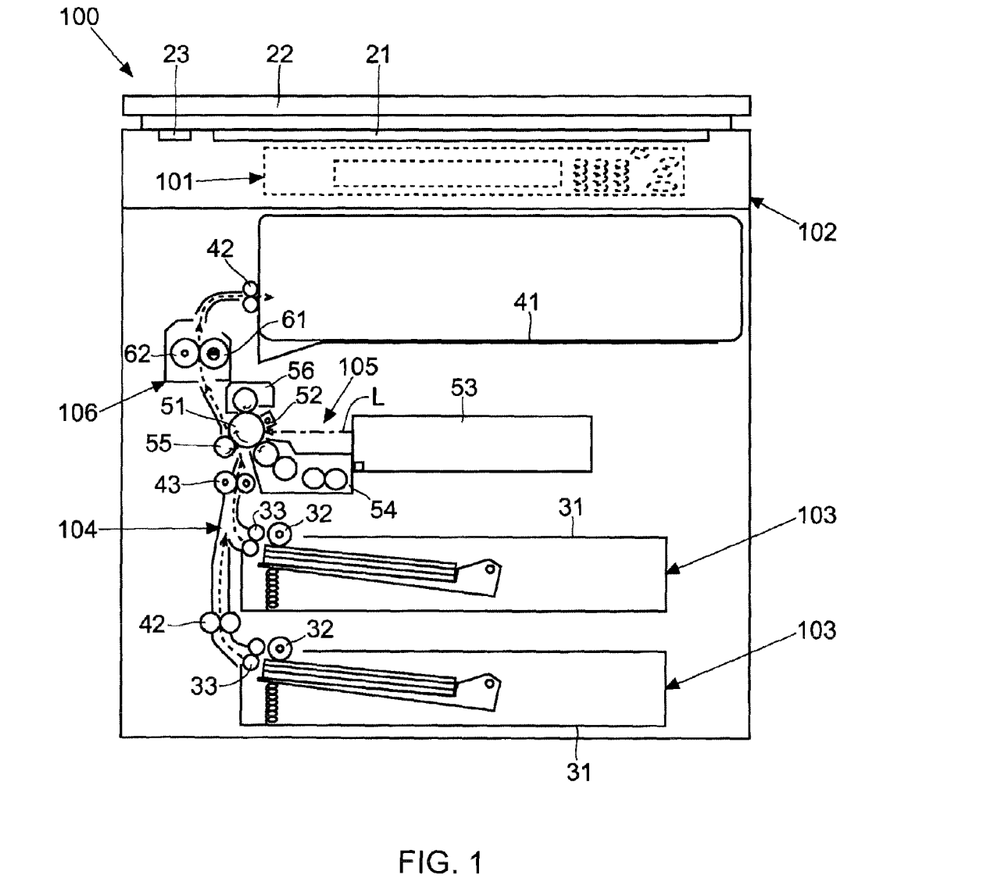
FIG. 1 is a diagram showing the overall configuration of an image forming apparatus according to an embodiment of the present disclosure.

Referring to FIG. 1, the configuration of an image forming apparatus 100 according to an embodiment of the present disclosure will be described.

The image forming apparatus 100 in an embodiment is a multifunctional machine and can execute a plurality of kinds of jobs: copying; printing; scanning; acting as a facsimile machine, and so on. The image forming apparatus 100 permits, for example, a login user to use the apparatus (or to use a specific function). Accordingly, the user obtains a user authentication for logging in before using the image forming apparatus 100. Then the login user is permitted to use the image forming apparatus 100 within the scope of given authority.

Specifically, the image forming apparatus 100 includes an operation panel 101 (an operating section and an operation display section), an image reading unit 102, a paper feeding unit 103, a conveying path 104, an image forming unit 105, a fixing unit 106, and so on.

Figure 2:
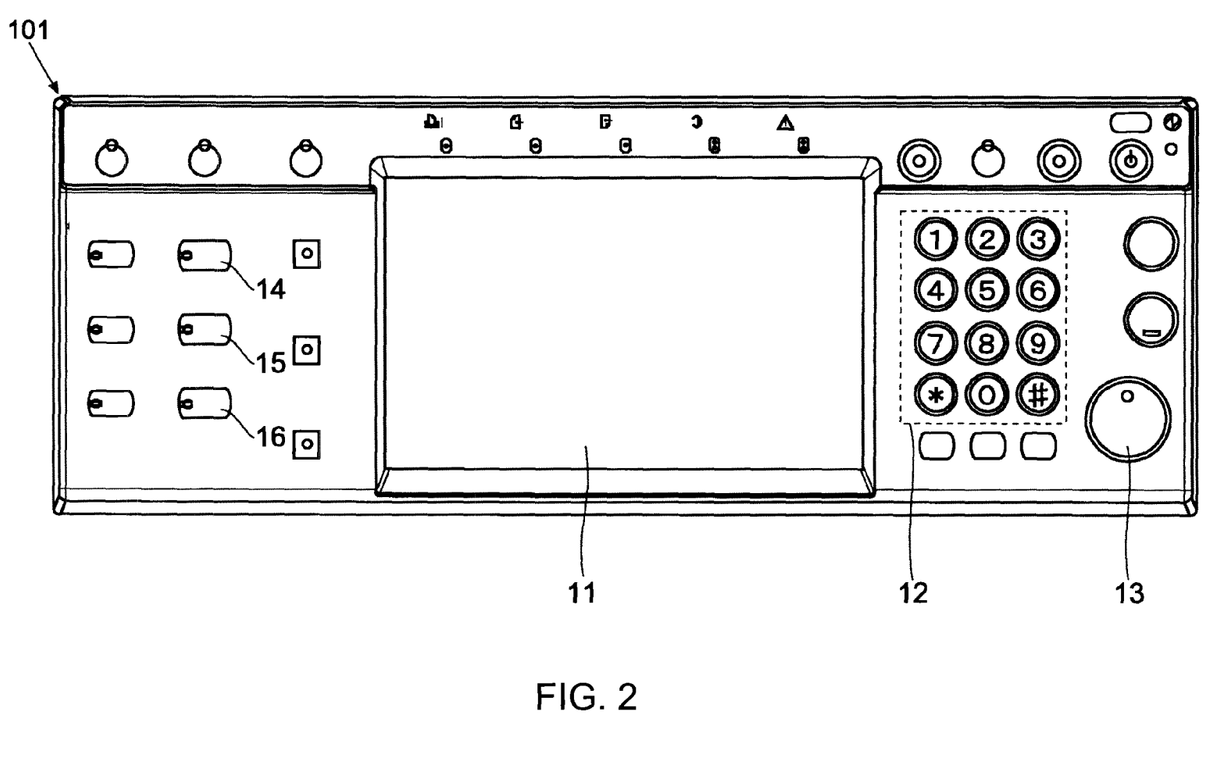
FIG. 2 is a detail diagram of an operation panel (an operating section and an operation display section) of the image forming apparatus shown in FIG. 1.

As shown in FIG. 2, the operation panel 101 includes a liquid-crystal display unit 11 having setting keys (software keys) for receiving various setting instructions. The liquid-crystal display unit 11 has a configuration in which the display surface is covered with a touch panel. Thus, when a setting key displayed on the liquid-crystal display unit 11 is pressed by the user, the operation panel 101 can detect the coordinates of the pressed position based on the output from the touch panel.

The operation panel 101 further includes hardware keys, such as a ten-key pad 12 and a start button 13. The ten-key pad 12 is a hardware keypad for receiving setting instructions that need numerical input. The start button 13 is a hardware key for receiving various job execution instructions from the user.

The operation panel 101 further includes, as hardware keys, job selection keys, such as a copy key 14, a send key 15, and a box key 16. When the copy key 14 is pressed by the user, a function screen including setting keys and so on necessary for setting a copy function is displayed on the liquid-crystal display unit 11. When the send key 15 is pressed by the user, a function screen including setting keys and the like for setting a scanner function or a facsimile function is displayed on the liquid-crystal display unit 11. When the box key 16 is pressed by the user, a function screen including setting keys and so on necessary for setting the function of a box (for example, a storage area provided in a storage unit 113, described later) is displayed on the liquid-crystal display unit 11.

Referring back to FIG. 1, the image reading unit 102 reads a document and generates image data. The image reading unit 102 includes optical-system members, such as an exposure lamp, a mirror, a lens, and an image sensor (not shown). When reading a document that is placed on a placed-document reading contact glass 21, the image reading unit 102 irradiates the document with light from the exposure lamp, converts the output value from the image sensor that has received the reflected light from analog to digital, and performs various corrections (shading correction and so on) on the converted data to generate image data. Thus, printing can be performed based on the image data acquired by the document reading operation of the image reading unit 102. Furthermore, the image data acquired by the document reading operation of the image reading unit 102 can be accumulated.

The image reading unit 102 also includes a document cover 22. When a document placed on the placed-document reading contact glass 21 is read, the document so placed can be held by the document cover 22. The document cover 22 may also function as a document conveyer. In this case, the document can be fed one at a time to a fed-document reading contact glass 23 by the document cover 22.

The paper feeding unit 103 has a plurality of cassettes 31 that store paper. The paper stored in the plurality of cassettes 31 is fed to the conveying path 104. The paper feeding unit 103 includes pickup rollers 32 for picking up the stored paper, separation roller pairs 33 for preventing paper from being fed one on another.

The conveying path 104 feeds paper in the apparatus. Specifically, the paper fed out from the paper feeding unit 103 is guided to the output tray 41 by the conveying path 104 through the image forming unit 105 and the fixing unit 106 in this order. The conveying path 104 is provided with a plurality of conveying roller pairs 42 for feeding the paper and a registration roller pair 43 that makes the paper wait ahead of the image forming unit 105 and that feeds the paper to the image forming unit 105 in exact timing.

The image forming unit 105 forms a toner image based on the image data and transfers the toner image to the paper. The image forming unit 105 includes a photosensitive drum 51, a charging unit 52, an exposing unit 53, a developing unit 54, a transfer roller 55, a cleaning unit 56, and so on.

In the process of forming the toner image and transferring the toner image to the paper, first, the surface of the photosensitive drum 51 that is rotationally driven by a driving source (not shown) is charged to a predetermined potential by the charging unit 52. The exposing unit 53 outputs a light beam L on the basis of the image data to scan and expose the surface of the photosensitive drum 51 with the light. Thus, a static latent image is formed on the surface of the photosensitive drum 51. Next, the developing unit 54 supplies toner to the static latent image formed on the surface of the photosensitive drum 51 to develop the image.

Then, the transfer roller 55 contacts the surface of the photosensitive drum 51. Thereafter, the registration roller pair 43 advances the paper between the transfer roller 55 and the photosensitive drum 51, at a predetermined timing. At that time, a predetermined voltage is applied to the transfer roller 55. Thus, the toner image on the surface of the photosensitive drum 51 is transferred to the paper. After the transfer process ends, the cleaning unit 56 removes the excess toner remaining on the surface of the photosensitive drum 51.

The fixing unit 106 fixes the toner image transferred to the paper by heating and pressing. The fixing unit 106 includes a fixing roller 61 that accommodates a heat generation source and a pressure roller 62 that is in contact with the fixing roller 61. The paper to which the toner image is transferred is heated and pressed by passing it between the fixing roller 61 and the pressure roller 62. Thus, the toner image is fixed to the paper, and printing is completed. The printed paper is guided to the conveying path 104, where it is fed to the output tray 41 by the conveying roller pairs 42.

Figure 3:
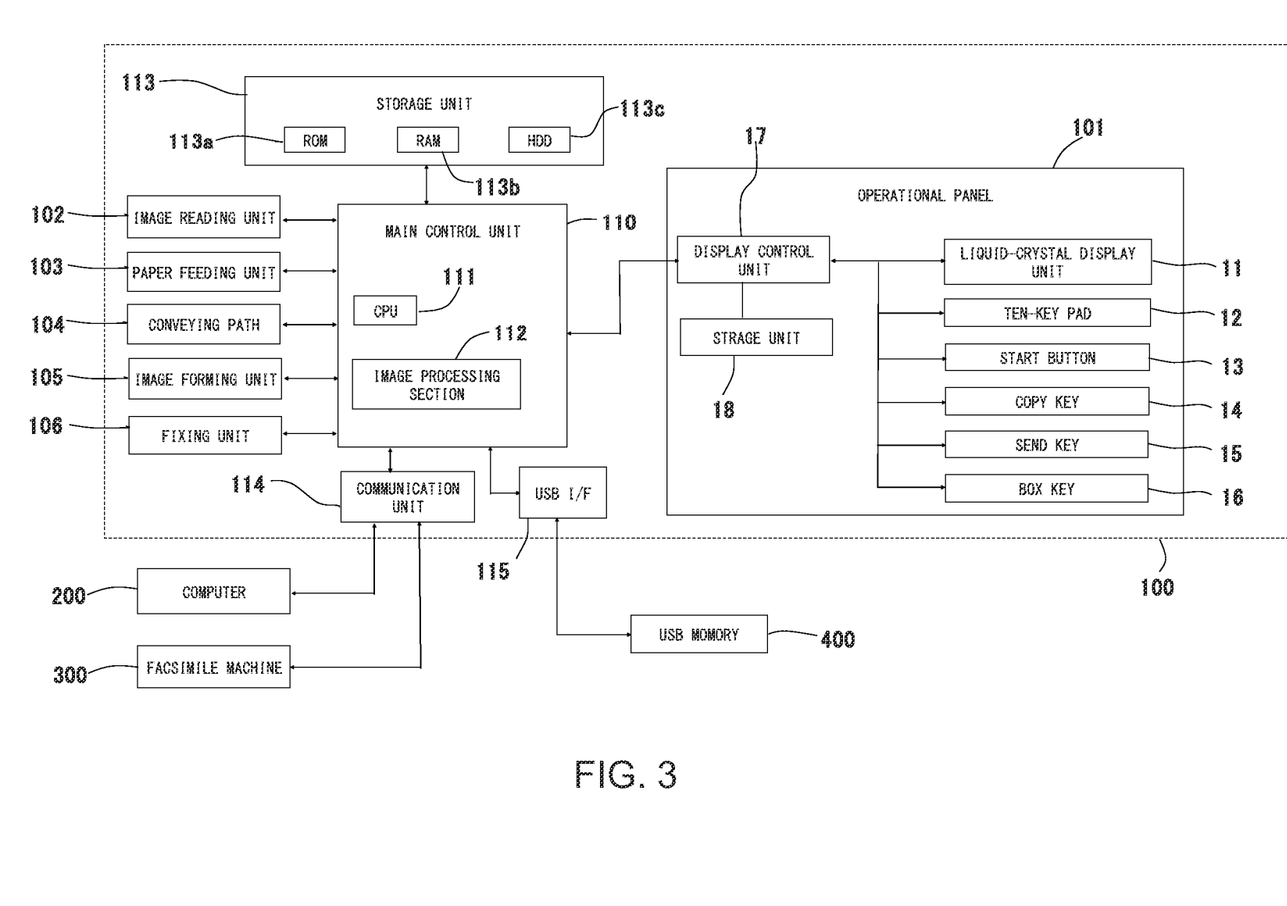
FIG. 3 is a block diagram showing the hardware configuration of the image forming apparatus shown in FIG. 1.

Referring next to FIG. 3, the hardware configuration of the image forming apparatus 100 will be described.

The image forming apparatus 100 includes a main control unit 110 (control unit). The main control unit 110 includes a CPU 111 serving as a central processing unit, an image processing section 112, and so on. The image processing section 112 includes an application specific integrated circuit (ASIC) only for image processing and a memory and performs various image processes, such as reduction/enlarge, density conversion, and data format conversion, on the image data.

The main control unit 110 is connected to the image reading unit 102, the paper feeding unit 103, the conveying path 104, the image forming unit 105, the fixing unit 106, and so on. The main control unit 110 controls the individual units and arithmetic operations based on the software stored in the storage unit 113. The main control unit 110 may be divided into a section that performs overall control and image processing and a section that controls the motors for rotating the various rotors.

The storage unit 113 includes a ROM 113a, a RAM 113b, and a HDD 113c. For example, the software is written to the ROM 113a. The RAM 113b serves as a work area for executing the software stored in the ROM 113a.

The main control unit 110 is connected to a communication unit 114. The communication unit 114 is connected to an external computer 200 via a network (or a cable) so as to be communicable therewith. This allows printing based on image data transmitted from the computer 200 to be performed and image data acquired by reading a document with the image reading unit 102 to be sent to the computer 200. Furthermore, the communication unit 114 may accommodate, for example, a modem, in which case facsimile communications with an external facsimile machine 300 can be performed via a network, such as a telephone line.

The main control unit 110 is also connected to a USB I/F 115 (connecting unit). A USB memory 400, serving as a portable storage medium, can be connected to the USB I/F 115. This allows printing based on image data stored in the USB memory 400 to be performed. Furthermore, image data acquired by reading a document with the image reading unit 102 can be accumulated in the USB memory 400.

The main control unit 110 is also connected to the operation panel 101 and controls the display of the liquid-crystal display unit 11. In addition to the main control unit 110, a display control unit 17 may be provided so as to control the display in accordance with an instruction from the main control unit 110. A storage unit 18 that stores programs for controlling the display and data may be separately provided.

For example, when a setting key displayed on the liquid-crystal display unit 11 is pressed by the user, the main control unit 110 receives the output from the touch panel and specifies the coordinates of the pressed position. Thus, the setting key that the user pressed is specified. Data, such as a table in which outputs from the touch panel and the coordinates of pressed positions are associated with each other, is stored in the storage unit 113 (or the storage unit 18).

Figure 4:
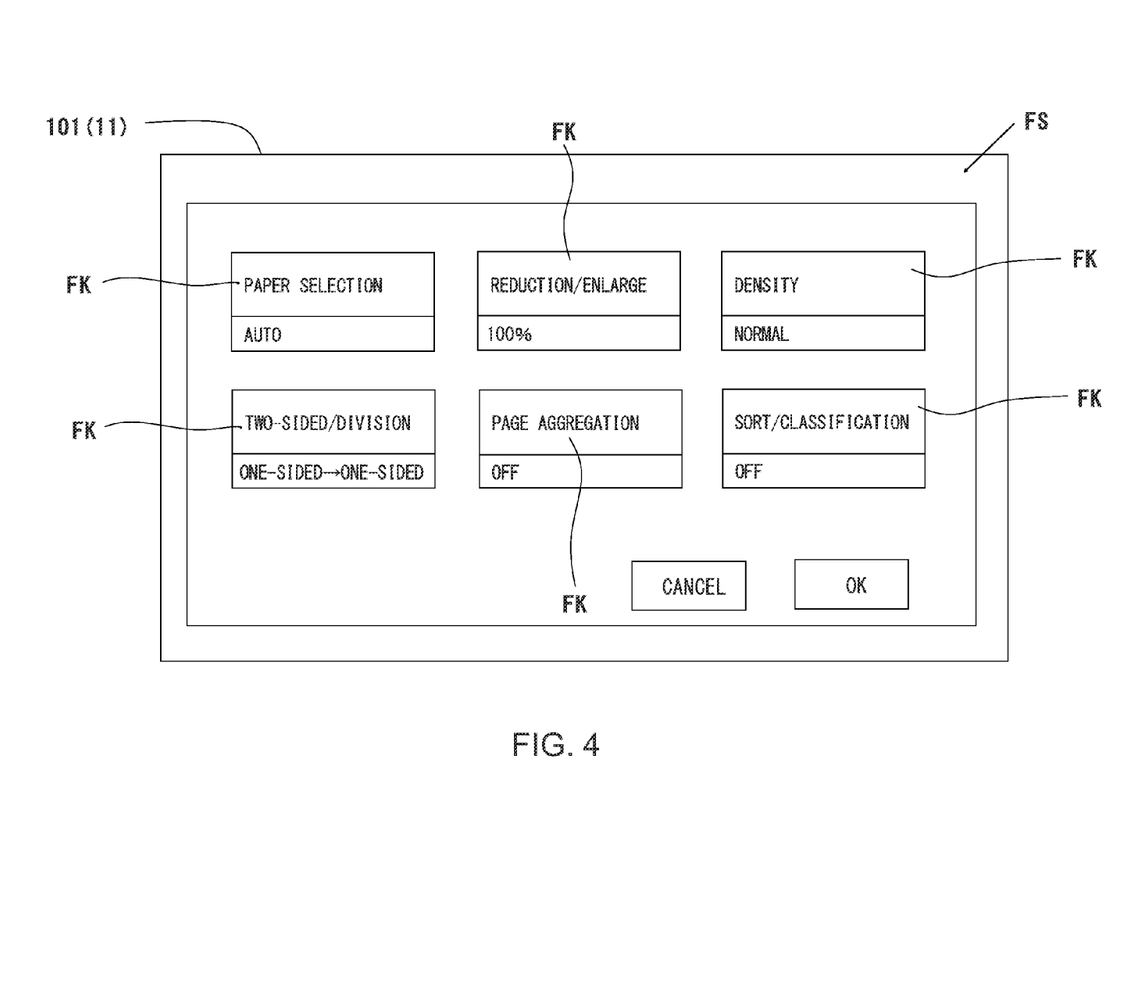
FIG. 4 is a diagram showing an example of a screen (a function screen) displayed on the operation panel shown in FIG. 2.

The main control unit 110 reads information stored in the storage unit 113 based on an operation that the user performed on the operation panel 101 and causes the operation panel 101 to display an appropriate screen. For example, if the user pressed the copy key 14, the main control unit 110 receives the user's copy key 14 pressing operation and causes the operation panel 101 to display a function screen FS (setting screen) for receiving a setting instruction relating to the copy function, as shown in FIG. 4.

The function screen FS is provided with a plurality of function setting keys FK that have function names, for example, paper selection, reduction/enlarge, density, two-sided/division, page aggregation, and sort/classification. The plurality of function setting keys FK are software keys for accepting target functions from the user. In other words, when setting a function, the user presses a function setting key FK that is given the name of the target function from the plurality of function setting keys FK.

Figure 5:
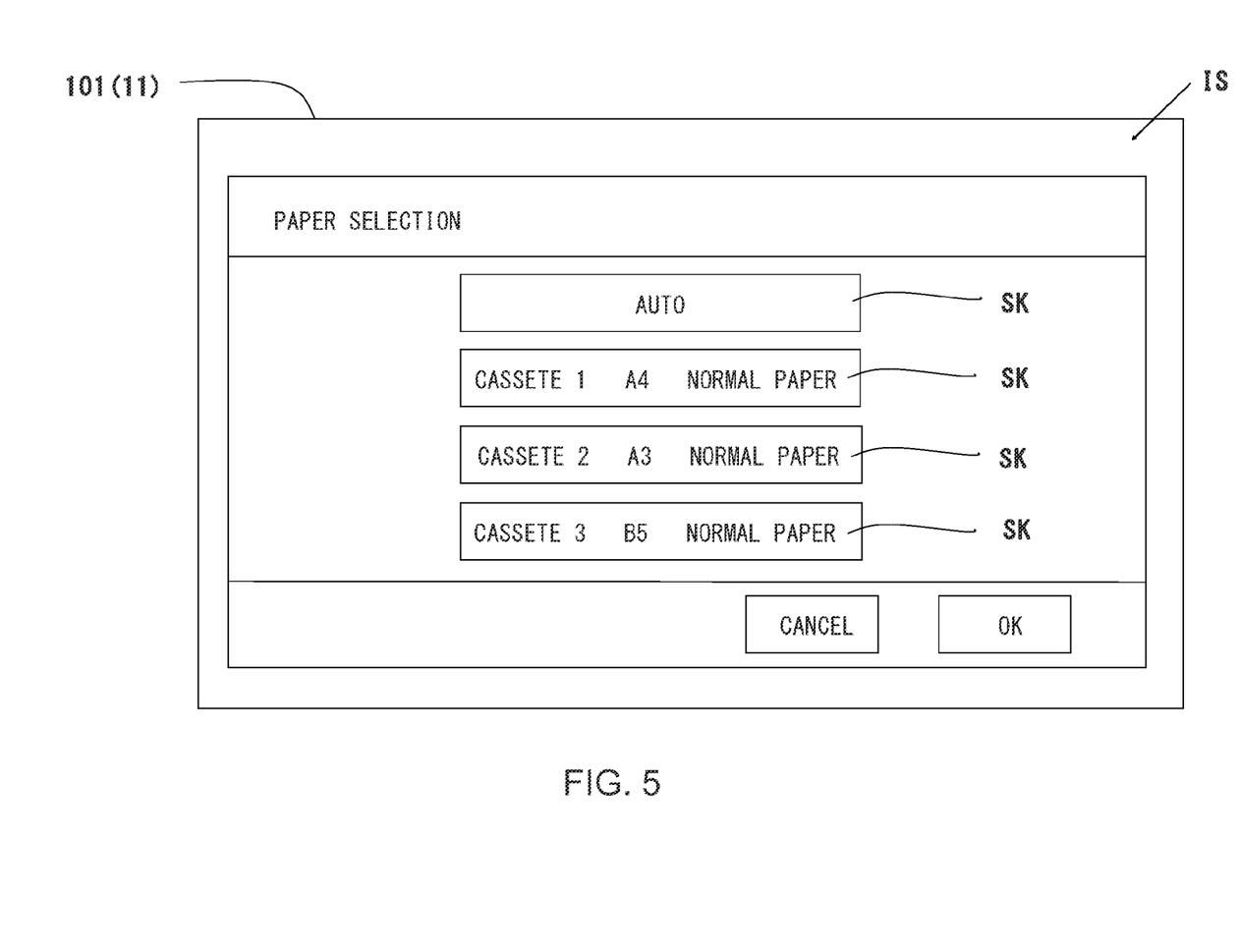
FIG. 5 is a diagram showing an example of a screen (a set-value input screen) displayed on the operation panel shown in FIG. 2.

When a function setting key FK for paper selection is pressed by the user, the main control unit 110 causes the operation panel 101 to display a set-value input screen IS (setting screen) including a plurality of paper setting keys SK, as shown in FIG. 5. This allows the user to set a function for paper selection by performing an input operation (the operation of pressing one of the plurality of paper setting keys SK) on the set-value input screen IS. For example, when the user wants to print on A4-size paper, the user presses a paper setting key SK that is given display name "cassette 1".

Although examples of setting items that can be set for executing copying are paper selection, reduction/enlarge, density, two-sided/division, page aggregation, and sort/classification, there are many other setting items, such as document size, document setting orientation, mixed document sizes, output destination, staple, color selection, document quality, EcoPrint, hue control, color balance, sharpness, ground color control, bleed-through prevention, saturation, binding margin, continuous reading, automatic image rotation, job end notification, document name input, priority printing, and interrupt copying. For jobs other than copying, there are many setting items that can be set for execution.

Therefore, all of the plurality of function setting keys FK corresponding to the plurality of setting items cannot be displayed on the function screen FS. Accordingly, the main control unit 110 displays only a predetermined number of function setting keys FK on the function screen FS. For example, function screen information (setting information) that defines function setting keys FK to be displayed on the function screen FS is stored in the storage unit 113, and the main control unit 110 determines a predetermined number of function setting keys FK to be displayed on the function screen FS based on the function screen information.

Here, when the image forming apparatus 100 is shared by a plurality of users, an ease-of-use function screen FS differs depending on the user. In other words, using copying as an example, a disposition in which a function setting key FK for setting two-sided/division is displayed on the function screen FS all the time is easier to use for a user who frequently changes the setting of two-sided/division, and a disposition in which a function setting key FK for setting page aggregation is displayed at all times is easier to use for a user who frequently changes the setting of page aggregation.

Accordingly, the image forming apparatus 100 stores user-specific function screen information customized to the individual users (sometimes referred to as my-panel information, for example) in the storage unit 113 to improve the ease-of-use for users, so that function screen information corresponding to the login user can be read every time the login user changes, and function setting keys FK to be displayed on the function screen FS can be switched. For example, the main control unit 110 determines whether user information (user name, password, etc.) that a user who wants to log in has inputted, is user information that can be authenticated. As a result of this determination, if it is user information that can be authenticated, the main control unit 110 permits logging-in, reads function screen information corresponding to the login user, and switches the function setting keys FK displayed on the function screen FS.

The login user can also select and combine a plurality of frequently used functions and can register the setting values of the plurality of functions as programs. Program information (setting information) corresponding to the programs that the login user has registered is stored, for example, in the storage unit 113. This allows the login user to set the setting values of the plurality of functions to desired values by only selecting a program that the user registered when executing a job, such as copying.

In an another example, the login user can also register an address book in which addresses and communication modes (for example, broadcast communication, private communication, and timer-programmed communication) are associated with each other. Address notebook information (setting information) corresponding to the address book that the login user has registered is stored, for example, in the storage unit 113. This allows the login user to set a communication mode by only selecting a destination address from the address book when performing facsimile communication.

However, when one image forming apparatus 100 is shared by a plurality of users, if user-specific setting information corresponding to the individual users is stored in the storage unit 113, the amount of information that is stored is greatly increased (the memory capacity of the storage unit 113 needs to be large). Furthermore, from the user's point of view, the user has to log in to achieve ease-of-use setting for the user (the user has to input user name and password), which is inconvenient.

Thus, in this embodiment, when the USB memory 400 in which user-specific setting information is stored is connected to the USB I/F 115, to perform a process based on the user-specific setting information stored in the USB memory 400 without changing default setting information stored in the storage unit 113. The user-specific setting information is setting information customized by the user; for example, function screen information, program information, and address book information.

Specifically, the user first connects the USB memory 400, in which no user-specific setting information is stored, to the USB I/F 115. When the USB memory 400 is connected to the USB I/F 115 by the user, the main control unit 110 causes the operation panel 101 to display a reception screen for receiving an instruction indicating whether to generate user-specific setting information. For example, the operation panel 101 displays a dialog box DB1, as shown in FIG. 6, in which a message for receiving an instruction to generate user-specific setting information (for example, a message "Do you want to generate user-specific setting information?") and a reception key K11 are displayed.

When the reception key K11 is pressed by the user, the main control unit 110 stores default setting information in the USB memory 400. Thereafter, the user changes the function setting keys FK to be displayed on the function screen FS or adds a program or an address book or changes the program or address book by performing an input operation on the operation panel 101. At that time, the main control unit 110 changes the setting information stored in the USB memory 400, without changing the default setting information stored in the storage unit 113, based on the setting change instruction that the operation panel 101 has received. Thus, the USB memory 400 that stores the user-specific setting information that is customized to the user can be obtained. This allows the user to perform a process based on the user-specific setting information with the image forming apparatus 100 from the next time only by connecting the thus-obtained USB memory 400 to the USB I/F 115.

Figure 6:
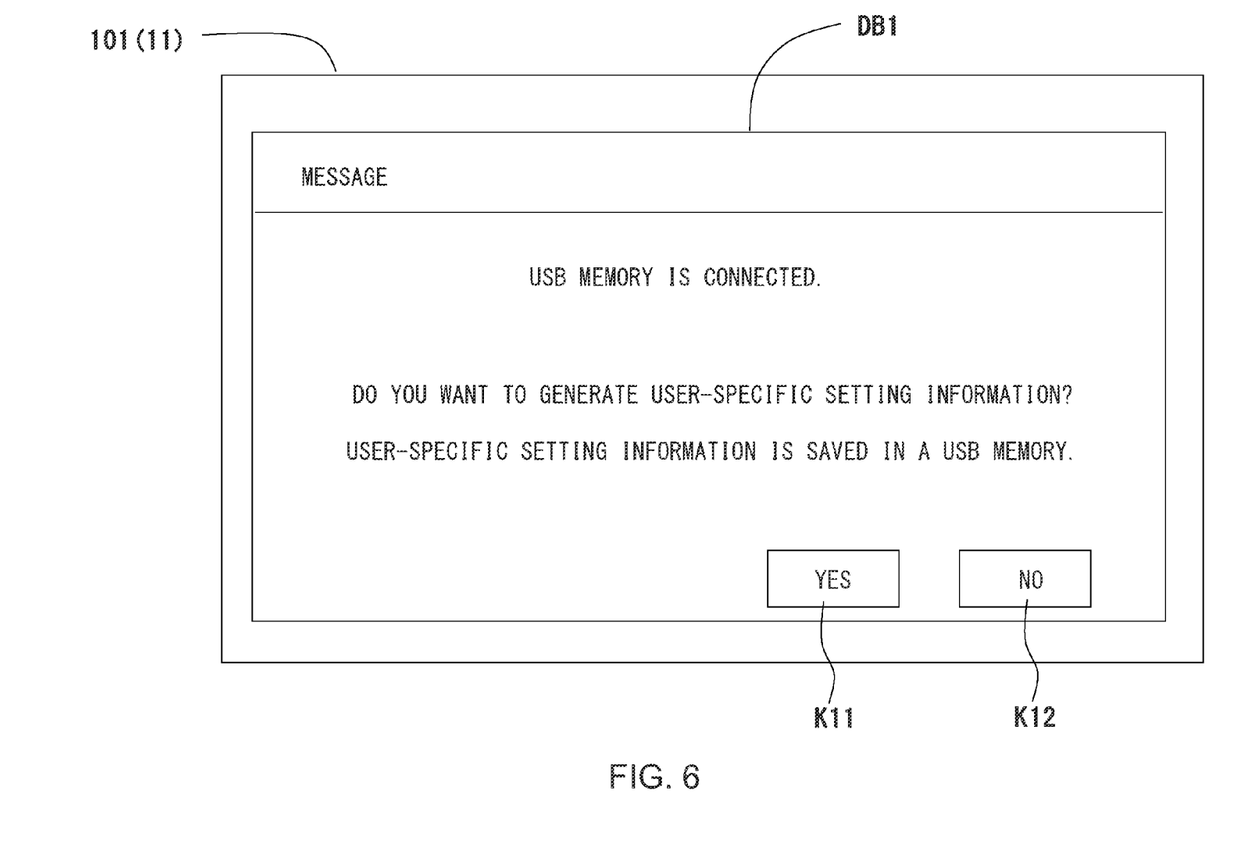
FIG. 6 is a diagram showing an example of a screen (a screen for receiving an instruction indicating whether to generate user-specific setting information) displayed on the operation panel shown in FIG. 2.

If the user presses a software key K12 in the dialog box DB1 shown in FIG. 6, no user-specific setting information is generated.

Figure 7:
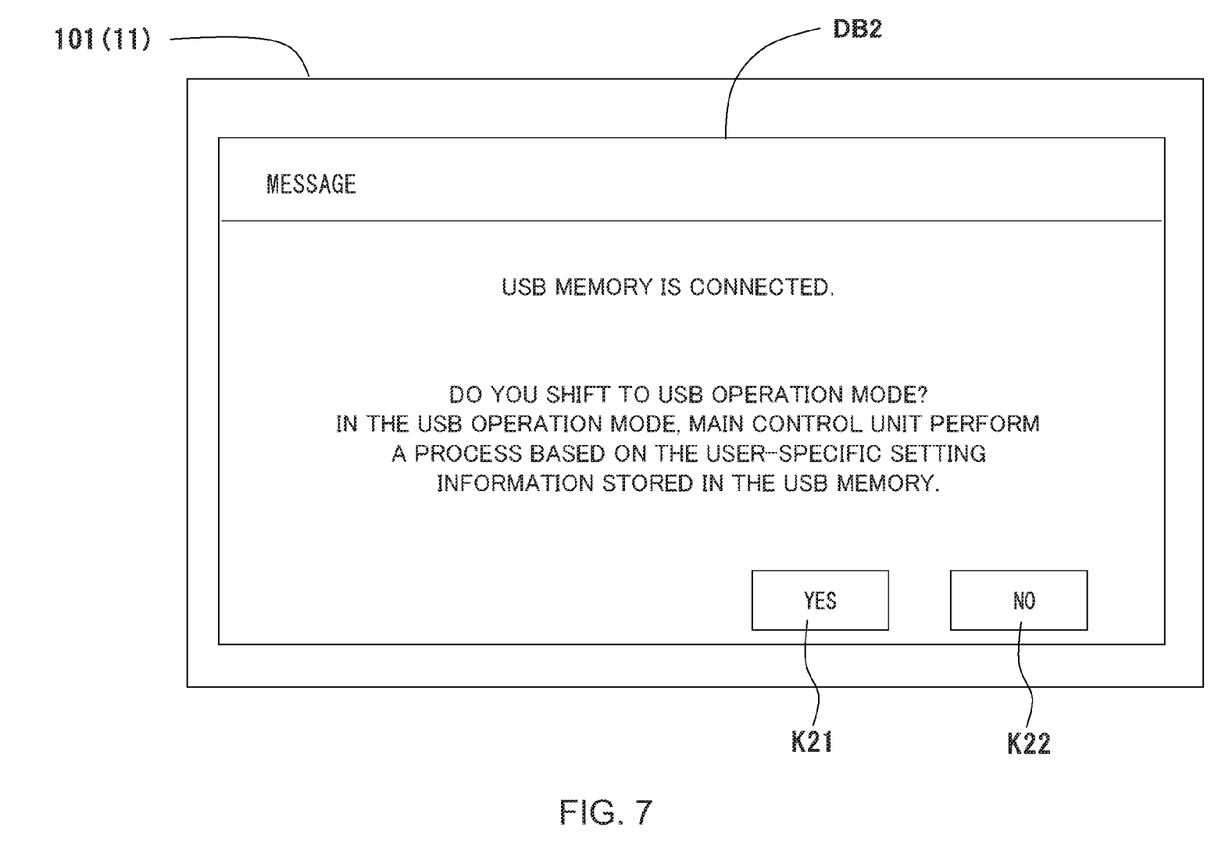
FIG. 7 is a diagram showing an example of a screen (a screen for receiving an instruction indicating whether to shift to a USB operation mode) displayed on the operation panel shown in FIG. 2.

For example, when the user connects the USB memory 400 that stores the user-specific setting information to the USB I/F 115, the main control unit 110 causes the operation panel 101 to display a dialog box DB2, as shown in FIG. 7, and receives an instruction indicating whether to shift to a USB operation mode from the user. For example, a message for receiving an instruction to shift to the USB operation mode (for example, a message "Do you shift to USB operation mode?") and a reception key K21 are displayed in the dialog box DB2. When the reception key K21 is pressed by the user, the main control unit 110 shifts to the USB operation mode. In other words, the main control unit 110 performs a process based on the user-specific setting information stored in the USB memory 400.

If the user presses a software key K22 in the dialog box DB2 shown in FIG. 7, a shift to the USB operation mode is not performed.

Figure 8:
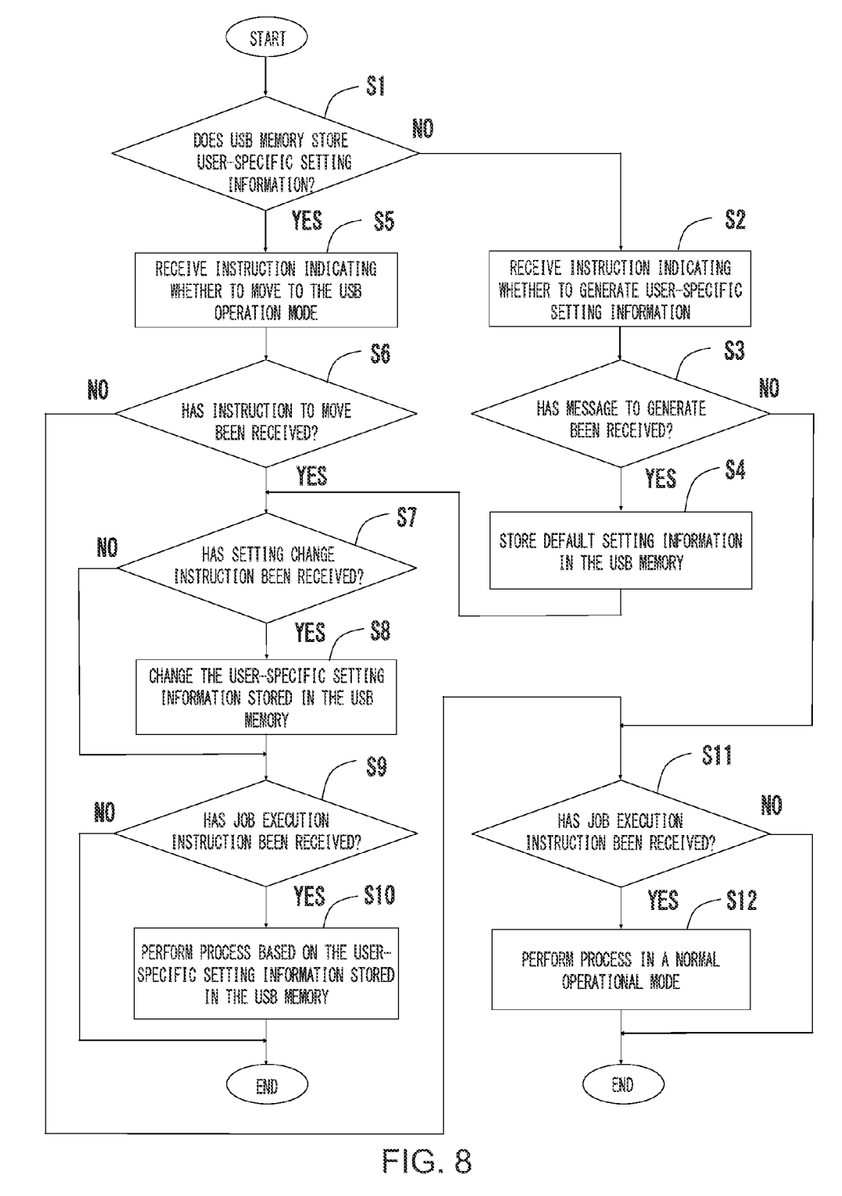
FIG. 8 is a flowchart explaining the operation of an image forming apparatus according to an embodiment of the present disclosure.

Referring next to FIG. 8, an operation when the USB memory 400 is connected to the USB I/F 115 will be described. The flowchart in FIG. 8 starts when the user connects the USB memory 400 to the USB I/F 115.

In step S1, the main control unit 110 determines whether the USB memory 400 stores user-specific setting information. As a result of this determination, if the USB memory 400 stores no user-specific setting information, the process moves to step S2.

In step S2, the main control unit 110 receives an instruction indicating whether to generate user-specific setting information. At that time, the main control unit 110 causes the operation panel 101 to display the dialog box DB1 (see FIG. 6). In step S3, the main control unit 110 determines whether a message to generate user-specific setting information has been received. As a result of this determination, if the message to generate user-specific setting information has been received, the process moves to step S4.

In step S4, the main control unit 110 stores default setting information in the USB memory 400. Thereafter, the process moves to step S7.

Referring back to step S1, if the USB memory 400 stores user-specific setting information, the process moves to step S5.

In step S5, the main control unit 110 receives an instruction indicating whether to move to the USB operation mode. At that time, the main control unit 110 causes the operation panel 101 to display the dialog box DB2 (see FIG. 7). In step S6, the main control unit 110 determines whether an instruction to move to the USB operation mode has been received. As a result of this determination, if the instruction to move to the USB operation mode has been received, the process moves to step S7. At the same time, the main control unit 110 causes the operation panel 101 to display a setting screen (the function screen FS or the set-value input screen IS) based on the user-specific setting information (function screen information) stored in the USB memory 400.

In step S7, the main control unit 110 determines whether the operation panel 101 has received a setting change instruction. As a result of the determination, if the operation panel 101 has received the setting change instruction, the process moves to step S8, and if the operation panel 101 has received no setting change instruction, step S8 is omitted, and the process moves to step S9.

In step S8, the main control unit 110 changes the user-specific setting information stored in the USB memory 400 (or the default setting information stored in the USB memory 400), without changing default setting information stored in the storage unit 113, based on the setting change instruction that the operation panel 101 has received. Then, the main control unit 110 causes the operation panel 101 to display a setting screen (the function screen FS or the set-value input screen IS) based on user-specific setting information (function screen information) stored in the USB memory 400.

Thereafter, in step S9, the main control unit 110 determines whether the operation panel 101 has received a job execution instruction. As a result of this determination, if the operation panel 101 has received a job execution instruction, the process moves to step S10, and if the operation panel 101 has received no job execution instruction, the process ends.

In step S10, the main control unit 110 performs a process based on the user-specific setting information stored in the USB memory 400 without changing the default setting information stored in the storage unit 113.

In step S3, if an instruction to generate user-specific setting information has not been received, the process moves to step S11. Also when an instruction to move to the USB operation mode has not been received in step S6, the process moves to step S11. In step S11, the main control unit 110 determines whether the operation panel 101 has received a job execution instruction. As a result of this determination, if the operation panel 101 has received the job execution instruction, the process moves to step S12, and if the operation panel 101 has received no job execution instruction, the process ends.

In step S12, the main control unit 110 performs a process in a normal operation mode. In other words, the main control unit 110 performs a process based on the default setting information stored in the storage unit 113.

In this embodiment, as described above, when the USB memory 400 (portable storage medium), in which user-specific setting information is stored, is connected to the USB I/F 115 (connecting unit), the main control unit 110 (control unit) performs a process based on the user-specific setting information stored in the USB memory 400 without changing the default setting information stored in the storage unit 113. For example, the main control unit 110 causes the operation panel 101 (operation display section) to display the function screen FS (setting screen) or the set-value input screen IS (setting screen) based on the function screen information (user-specific setting information) stored in the USB memory 400. Thus, for a user who wants the image forming apparatus 100 to perform a process based on the default setting information, the setting information stored in the storage unit 113 is maintained as the default even if another user previously made the image forming apparatus 100 perform a process based on user-specific setting information. Thus, there is no need to perform an operation that returns the setting information to the default setting information, which is convenient for the user. Furthermore, since user-specific setting information is stored in the USB memory 400 in advance, and the setting is switched to desired setting only by connecting the USB memory 400 to the USB I/F 115. Therefore, for a user who wants the image forming apparatus 100 to perform a process based on the user-specific setting information, there is no need to perform an operation that changes the setting, which is convenient.

Furthermore, in this embodiment, there is no need to store a plurality of items of user-specific setting information corresponding to the individual users in the storage unit 113 even under an environment in which the image forming apparatus 100 is shared by a plurality of users, and the plurality of users individually make the image forming apparatus 100 perform a process based on user-specific setting information. Since this can prevent the amount of information stored from greatly increasing, the need for increasing the capacity of the storage unit 113 is eliminated (an increase in cost can be prevented).

Furthermore, as described above, this embodiment is configured such that, in the case where the USB memory 400 in which user-specific setting information is stored is connected to the USB I/F 115, when the operation panel 101 has received a setting change instruction, the main control unit 110 changes the user-specific setting information stored in the USB memory 400, without changing the default setting information stored in the storage unit 113, based on the setting change instruction that the operation panel 101 has received. With this configuration, the user-specific setting information stored in the USB memory 400 is updated every time the operation panel 101 receives a setting change instruction. This is convenient for the user because the setting is switched to a setting that reflects the most recent setting change when the user connects the USB memory 400 to the USB I/F 115 at the next using of the image forming apparatus 100.

Furthermore, this embodiment is configured such that, when the USB memory 400, in which no user-specific setting information is stored, is connected to the USB I/F 115, the operation panel 101 receives an instruction indicating whether to generate user-specific setting information, and when the operation panel 101 has received an instruction to generate user-specific setting information, the main control unit 110 stores default setting information in the USB memory 400, and when the operation panel 101 receives a setting change instruction after the default setting information is stored in the USB memory 400, the main control unit 110 changes the default setting information stored in the USB memory 400, without changing the default setting information stored in the storage unit 113, based on the setting change instruction that the operation panel 101 has received. With this configuration, the USB memory 400 in which user-specific setting information is stored can easily be obtained.

Here, the user who uses the image forming apparatus 100 sometimes transfers the image data from the image forming apparatus 100 to the USB memory 400 and accumulates it and sometimes transfers the image data stored in the USB memory 400 to the image forming apparatus 100 and prints it. Accordingly, it is not desirable for the user that generation of user-specific setting information is initiated only by connecting the USB memory 400 to the USB I/F 115. However, in this embodiment, when the USB memory 400 is connected to the USB I/F 115, generation of user-specific setting information is not automatically initiated, and an instruction indicating whether to generate user-specific setting information is received. This can enhance the convenience to a user who does not desire to generate user-specific setting information.

The foregoing embodiment may be configured such that information for user authentication is stored in the USB memory 400, and when the USB memory 400 is connected to the USB I/F 115, user authentication is automatically performed.

It is to be understood that the embodiment disclosed herein is illustrative and not restrictive in all respects. The scope of the present disclosure is to be defined by the appended claims rather than by the description of the embodiment, and all changes that fall within the claims or equivalence of the claims are intended to be embraced by the claims.

For example, although the embodiment has been described as applied to an example in which user-specific setting information is stored in a USB memory, the present disclosure is not limited thereto; user-specific setting information may be stored in a portable storage medium other than the USB memory.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus comprising:
an operation display unit that includes an operation display section having function setting keys for receiving various function setting instructions and receives various setting instructions;
a storage unit in which default setting information that defines function setting keys to be displayed on the operation display section is stored;
a connecting unit configured to connect a portable storage medium that can store user-specific setting information customized to individual users that defines function setting keys to be displayed on the operation display section; and
a control unit configured, when the portable storage medium in which the user-specific setting information is stored is connected to the connecting unit, to perform a process that is based on the user-specific setting information stored in the portable storage medium without changing the default setting information stored in the storage unit,
wherein when the portable storage medium in which the user-specific setting information is stored is connected to the connecting unit, the control unit causes the operation display section to display function setting keys based on the user-specific setting information stored in the portable storage medium without changing the default setting information stored in the storage unit,
wherein when the portable storage medium in which no user-specific setting information is stored is connected to the connecting unit, the operation display section receives an instruction indicating whether to generate the user-specific setting information, and wherein when the operation display section has received an instruction to generate the user-specific setting information, the control unit stores the default setting information stored in the storage unit into the portable storage medium, and when the operation display unit has received a setting change instruction for changing function setting keys to be displayed on the operation display section after the default setting information is stored in the portable storage medium, the control unit changes the default setting information stored in the portable storage medium, without changing the default setting information stored in the storage unit, based on the setting change instruction that the operation display unit has received.

2. The image forming apparatus according to claim 1, wherein in the case where the portable storage medium in which the user-specific setting information is stored is connected to the connecting unit, when the operation display unit has received the setting change instruction, the control unit changes the user-specific setting information stored in the portable storage medium, without changing the default setting information stored in the storage unit, based on the setting change instruction that the operation display unit has received.

3. The image forming apparatus according to claim 1, wherein when the portable storage medium in which the user-specific setting information is stored is connected to the connecting unit, the operation display section receives an instruction to operate the image forming apparatus based on the default setting information stored in the storage unit or an instruction to operate the image forming apparatus based on the user-specific setting information stored in the portable storage medium.

4. The image forming apparatus according to claim 3, wherein when the operation display section receives the instruction to operate the image forming apparatus based on the user-specific setting information stored in the portable storage medium, the control unit causes the operation display section to display function setting keys based on the user-specific setting information stored in the portable storage medium.

5. The image forming apparatus according to claim 1, wherein when the operation display section receives an instruction indicating whether to generate the user-specific setting information, the operation display section displays a reception key for receiving an instruction to generate the user-specific setting information; and when the reception key is pressed, the control unit generates the user-specific setting information.

6. The image forming apparatus according to claim 1, wherein the function setting keys include a paper selection key, a reduction/enlarge key, a density key, a two-sided/division key, a page aggregation key, and a sort/classification key.

* * * * *